May 14, 1929.　　　L. F. KENNEDY　　　1,713,182
PROTECTIVE ARRANGEMENT
Filed March 20, 1928
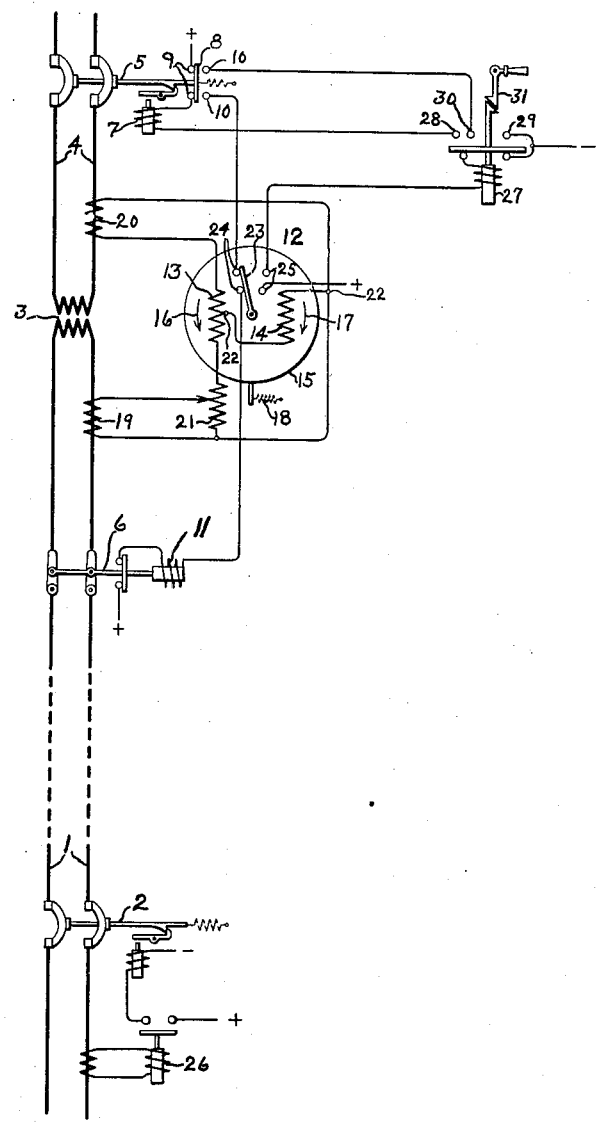
Inventor:
Luke F. Kennedy
by Charles E. Tullar
His Attorney Patented May 14, 1929.

1,713,182

UNITED STATES PATENT OFFICE.

LUKE F. KENNEDY, OF SCHENECTADY, NEW YORK, ASSIGNOR TO GENERAL ELECTRIC COMPANY, A CORPORATION OF NEW YORK.

PROTECTIVE ARRANGEMENT.

Application filed March 20, 1928. Serial No. 263,144.

My invention relates to improvements in protective arrangements for electric systems and more particularly to improvements in balanced protective arrangements for a portion of an electric circuit which may include windings of apparatus, such as transformers, generators, etc. An object of my invention is to provide an improved and economical protective arrangement whereby on the occurrence of a predetermined unbalance between corresponding electric quantities of a circuit at two points thereof, a portion of the circuit can be isolated through two switches one of which is capable of rupturing the power of the circuit while the other is not.

My invention will be better understood from the following description when considered in connection with the accompanying drawing and its scope will be pointed out in the appended claims.

The single figure of the accompanying drawings illustrates diagrammatically an embodiment of my invention as applied to a single phase A. C. circuit comprising a high tension feeder 1 which may lead from a suitable supply through a station circuit breaker 2 to a power transformer 3 and thence to a low tension feeder 4 to a network or the like to be supplied. In order to protect the portion of the circuit including the transformer 3 on the occurrence of a fault thereon, it is desirable to be able to isolate the transformer. While this could readily be done by employing switches capable of interrupting the full power of the circuit under fault conditions such switches or circuit breakers are necessarily costly particularly for extended networks.

In accordance with my invention, I propose to reduce the cost of the necessary switch gear without sacrificing the protection by providing at two points of the circuit, for example on opposite sides of the transformer 3, a circuit breaker 5 and a disconnecting switch 6. As shown the circuit breaker 5 is of the latched closed type and is provided with a trip coil 7 and an auxiliary switch 8 arranged to close contacts 9 in the trip coil circuit when the circuit breaker is closed and to close contacts 10 when the circuit breaker is open for a purpose which will hereinafter appear. For opening the disconnecting switch 6, it is provided with any suitable operating means such as a solenoid winding 11 which when energized effects the opening of the switch.

For controlling the circuit breaker 5 and the switch 6 so as to effect the opening thereof on the occurrence of a fault on the transformer, I provide protective means which is operative on the occurrence of a predetermined unbalance between the currents on opposite sides of the transformer to control the energization of the trip coil 7 and the opening winding 11. This protective means may comprise a differential relay 12 examples of which are known to the art. The particular relay which is schematically illustrated as of the induction disk type comprises two cooperating windings 13 and 14 which are arranged to exert on a disk 15 opposing torques whose direction is independent of the direction of current in the winding in a manner well known to the art. The winding 13 is a restraining winding and tends to turn the disk 15 in the direction indicated by the arrow 16. The winding 14 is an operating winding and tends to turn the disk 15 in a direction indicated by the arrow 17. The disk is also biased for movement in a direction indicated by the arrow 16 by any suitable means such as a spring 18 which may be relatively light.

The restraining winding 13 is connected to be energized in accordance with the sum of the currents on each side of the transformer 3. For this purpose the winding 13 may be connected in series with a circulating current circuit which is energized through current transformers 19 and 20 connected cumulatively, an autotransformer 21 being used when necessary for the purpose of obtaining equal currents from the current transformers 19 and 20 independently of their transformation ratios. Across equi-potential points 22 of the circulating current circuit is connected the operating winding 14 which is consequently energized in accordance with the difference between the currents on the two sides of the transformer. With this arrangement the operating winding 14 predominates over the restraining winding 13 to move the disk 15 in a direction indicated by the arrow 17 when the ratio of the currents on the two sides of the transformer 3 exceeds a predetermined value. In this movement a circuit controlling member 23 which moves with the disk 15 is moved from its normal position in which it closes contacts 24 to another position in which it closes contacts 25. The circuit controlling member 23 will be retained in this other position as long as the predetermined unbalance or ratio exists. The contacts 24 are arranged in the circuit which controls the opening winding 11 of the disconnecting switch 6 and the contacts 25 are arranged in a circuit through which the opening of the circuit breaker 5 is effected.

In order to eliminate any possibility of opening the disconnecting switch 6 while current is being fed therethrough to the fault, I provide control means whereby the disconnecting switch can not be opened until after the opening of the circuit breaker 5 and after cessation of current flow to the fault is effected. This may be caused by the opening of the circuit breaker 2 in the feeder 1 at the station from which the feeder is supplied by any suitable means herein indicated as an overload relay 26 arranged to control the trip circuit of the circuit breaker 2. The control means is illustrated as a relay 27 of the hand reset type. This relay 27 is arranged when moved to the energized position to remain there and to close contacts 28 and 29 in the circuit of the trip coil 7, thereby effecting the opening of the circuit breaker 5. It is also arranged to close contacts 29 and 30 in the control circuit of the operating winding 11 of the disconnecting switch 6. It is further shown as being arranged to open its own winding circuit when moved to the energized position. The control relay 27 is arranged to be energized on the occurrence of a predetermined unbalance of the currents on the two sides of the transformer 3 and for this purpose the contacts 25 of the differential relay 12 are connected in circuit with the winding of the relay 27.

Under normal conditions the positions of the parts will be as indicated schematically in the drawing. On the occurrence of a fault on the transformer 3 which brings about the predetermined unbalance in currents for which the relay 12 is set to operate, the operating winding 14 will predominate to effect the closing of the contacts 25 and thereby the energization of the control relay 27. This relay will be moved to the energized position where it will be engaged and held by the reset lever 31. In this position of the control relay, the contacts 28 and 29 will be closed to complete the circuit of the trip coil 7 thereby effecting the opening of the circuit breaker 5. Even though the circuit breaker 5 is open, thus preventing any possibility of feed back from the network to the transformer 3, the unbalance between the currents on the two sides of the transformer 3 will still be greater than that for which the relay 12 is set to operate, since the current input from the low tension side of the transformer will be zero. Consequently, the operating winding 14 still predominates over the restraining winding 13 to maintain the circuit controlling member 23 in a position to close contacts 25. This condition will be maintained as long as current is fed to the fault through the disconnecting switch 6. This current supply will not normally be maintained for any great length of time, since circuit interrupting means such as the circuit breaker 2 at the station supplying the feeder 1 will operate in response to the fault condition to deenergize the high tension feeder 1. As soon as this occurs the windings of the relay 12 become deenergized and under the influence of the spring 18, the circuit controlling member 23 is moved in the direction indicated by the arrow 16 to close the contacts 24. Therefore the control circuit of the operating winding 11 is energized since in the operation of the control relay 27 the contacts 29 and 30 were closed and in the opening of the circuit breaker 5 the contacts 10 were closed by the auxiliary switch 8. Upon the energization of the winding 11 the switch 6 is opened to complete the isolation of the transformer 3.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States, is:

1. In combination with an electric circuit and means for isolating a portion thereof comprising a circuit breaker at one point of the circuit and a disconnecting switch at another point of the circuit, means operative on the occurrence of a fault between said points for effecting the opening of said circuit breaker on the occurrence of a predetermined unbalance between the currents at said points and subsequently the opening of the disconnecting switch only after cessation of current flow through the disconnecting switch to the fault including a differential relay connected to be energized in accordance with the relative values of the currents at said points.

2. In combination with an electric circuit including a power transformer and means for isolating the transformer from the circuit including a circuit breaker on one side of the transformer and a disconnecting switch on the other side of the transformer, means operative on the occurence of a fault on the transformer for effecting the opening of the circuit breaker and subsequently the opening of the disconnecting switch, including a relay having a member arranged to be moved to one position to effect the opening of the circuit breaker on the occurrence of a predetermined unbalance between the currents on the two sides of the transformer and biased for movement to another position to effect the opening of the disconnecting switch only on cessation of current flow therethrough to the fault.

3. In combination with an electric circuit including a power transformer and means for isolating the transformer from the circuit including a circuit breaker on one side of the transformer and a disconnecting switch on the other side of the transformer, means operative on the occurrence of a fault on the transformer, for effecting the opening of the circuit breaker and subsequently the opening of the disconnecting switch including a relay having a member arranged normally to be maintained in one position and to be moved to another position on the occurrence of a predetermined unbalance between the currents on the two sides of the transformer, a control relay arranged when energized to effect the opening of the circuit breaker and to be energized on movement of said member to said other position, and a control circuit for effecting the opening of said disconnecting switch arranged to be completed on the energization of the control relay, the opening of the circuit breaker and the return of said member to normal position.

4. In combination with an electric circuit and means for isolating a portion thereof comprising a circuit breaker at one point of the circuit and a disconnecting switch at another point of the circuit, means for effecting the opening of said isolating means in a predetermined sequence on the occurrence of a fault within said portion including a differential relay having a contact controlling member arranged to be moved to one position on the occurrence of a fault within said portion to effect the opening of the circuit breaker and to be maintained in said position as long as current is supplied to the fault through the disconnecting switch and after cessation of said supplied current to be moved to another position to effect the opening of the disconnecting switch.

5. In combination with an electric circuit and means for isolating a portion thereof comprising a circuit breaker at one point of the circuit and a disconnecting switch at another point of the circuit, means operative on the occurrence of a fault between said points for effecting the opening of the circuit breaker and subsequently the opening of the disconnecting switch including a relay having a member arranged normally to be maintained in one position and to be moved to another position on the occurrence of a predetermined unbalance between the currents at said points, a control relay arranged when energized to effect the opening of the circuit breaker and to be energized on movement of said member to said other position, and means operative on the return of said member to initial position for effecting the opening of said disconnecting switch after the opening of the circuit breaker and while the control relay remains in the position to which it is moved upon energization.

6. In combination with an electric circuit including a power transformer and means for isolating the transformer from the circuit including a circuit breaker on one side of the transformer and a disconnecting switch on the other side of the transformer, means operative on the occurrence of a fault on the transformer for effecting the opening of the circuit breaker and subsequently the opening of the disconnecting switch only after cessation of current flow through the disconnecting switch to the fault including a differential relay having two cooperating windings connected to be energized respectively in accordance with the sum of and difference between the currents on the two sides of the transformer.

7. In combination with an electric circuit including a power transformer and means for isolating the transformer from the circuit including a circuit breaker on one side of the transformer and a disconnecting switch on the other side of the transformer, means for effecting the opening of said isolating means in a predetermined sequence on the occurrence of a fault on the transformer including a differential relay having restraining and operating windings, said operating winding being connected to be energized in accordance with the difference between the currents on the two sides of the transformer, a movable circuit controlling member arranged when the operating winding predominates over the restraining winding to be moved to one position to effect the opening of the circuit breaker and to be maintained in said position as long as current is supplied to the fault through the disconnecting switch, and means for moving the member to another position after cessation of said supplied current to effect the opening of the disconnecting switch.

In witness whereof, I have hereunto set my hand this 19th day of March, 1928.

LUKE F. KENNEDY.